2,816,776
Patented Dec. 17, 1957

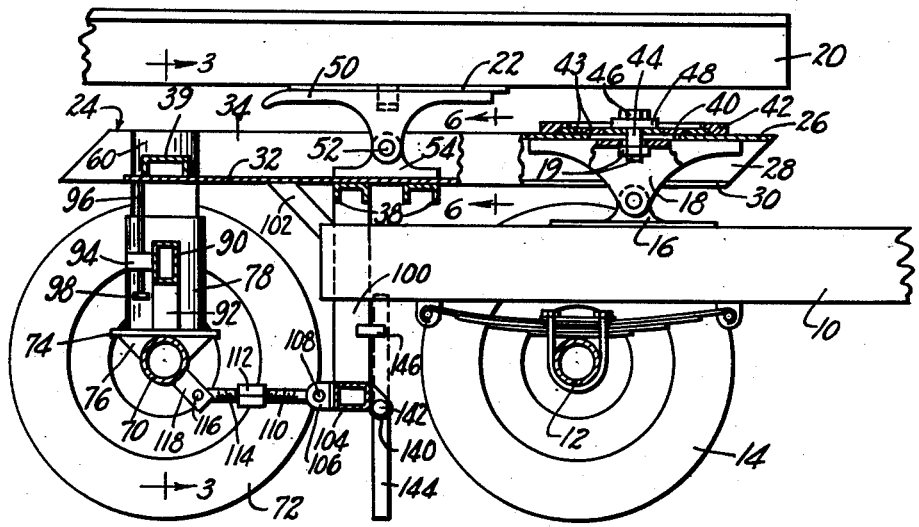

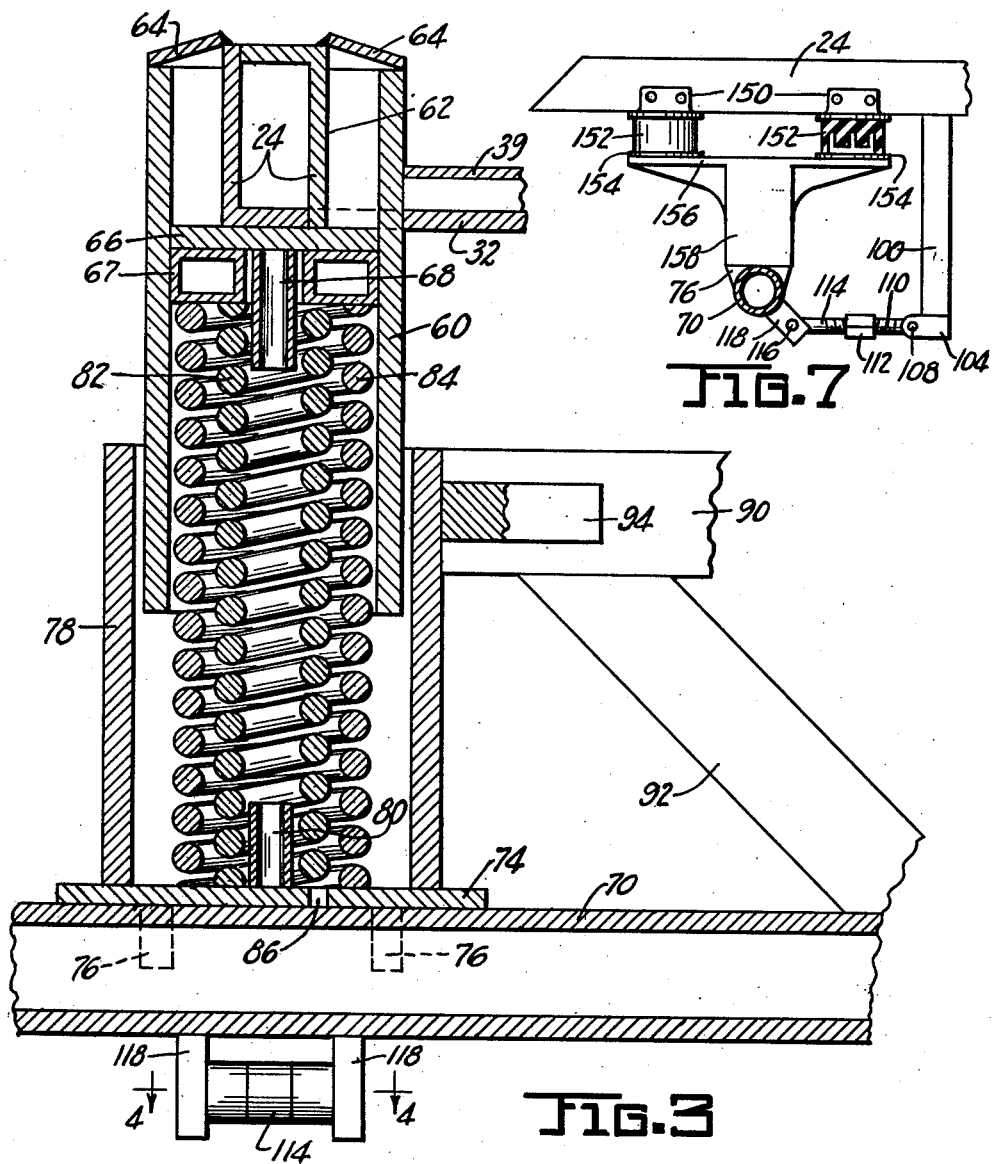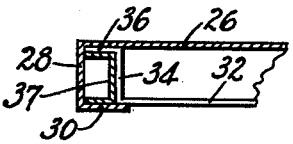

2,816,776
WHEELED TANDEM ATTACHMENT FOR COUPLING TRACTOR-TRAILERS

Herbert A. Nimtz, Three Oaks, Mich.

Application May 31, 1955, Serial No. 511,973

7 Claims. (Cl. 280—423)

This invention relates to improvements in tandem attachments for trucks, and more particularly to a tandem attachment interposed between a tractor and a semi-trailer and having spaced pivotal connections with both the tractor and trailer.

The primary object of this invention is to provide a device of this character which is strong, light in weight, which will effectively take a substantial part of the load of a semi-trailer, which is easy to install and remove, and which is adjustable to accommodate connection with trucks and semi-trailers of various makes and constructions.

A further object is to provide a device of this character which is effectively sprung to cushion the load regardless of road irregularities, and which is provided with a novel torque arm construction for stabilizing the spring-sustained wheel mount in upright position.

A further object is to provide a device of this character having a strong frame mounting longitudinally spaced fifth wheel attachment units at different levels to position the bed of a semi-trailer at a level spaced above the bed of a truck, with only minimum clearance to insure a compact structure and maintenance of the lowest center of gravity possible for the load upon the semi-trailer.

Other objects will be apparent from the following specification.

In the drawing:

Fig. 1 is a fragmentary side view illustrating the device connected between a tractor and a semi-trailer, with parts shown in section;

Fig. 2 is a fragmentary rear end view of the device;

Fig. 3 is an enlarged vertical sectional view taken on line 3—3 of Fig. 1;

Fig. 4 is a transverse detail sectional view taken on line 4—4 of Fig. 3;

Fig. 5 is a detail view illustrating an adjustable connector provided in the device;

Fig. 6 is a detail sectional view taken on line 6—6 of Fig. 1; and

Fig. 7 is a fragmentary side view illustrating a modified embodiment of the invention, with parts shown in section.

Referring to the drawings which illustrate the preferred embodiment of the invention, and particularly to Figs. 1 to 6, inclusive, the numeral 10 designates a portion of the frame or chassis of a tractor or truck spring supported on axle 12 mounting rear drive wheels 14. The chassis 10 mounts a support 16 for a conventional fifth wheel or pivot connection unit 18 of any conventional construction. The numeral 20 designates the frame of a semi-trailer having a bottom bearing plate 22 of a fifth wheel unit which mounts a conventional kingpin of the character well understood in the art.

My improved tandem attachment includes a main frame 24 having a pair of cooperating configured plate portions welded together to form a strong and sturdy unit. One of these portions consists of a horizontal plate 26 having downturned side flanges 28 and inturned bottom flanges 30. The plate 26 extends for a portion only of the length of the frame 24 at the front thereof, and the side portions 28, 30 extend full length of the frame. The second frame part consists of a horizontal plate 32 having upturned side flanges 34, and outwardly turned flanges 36. The side margins of the plate 32 preferably bear upon and are welded or otherwise anchored to the flanges 30, and the flanges 36 bear upon and are welded to the plate 26, so that the parts 36, 34, 30 and 28 cooperate to define a box structure extending lengthwise of the frame at each side thereof. If desired, further strength may be incorporated in the frame by a channel member or like structural member 37, as illustrated in Fig. 6. Likewise, additional reinforcement may be provided, as by transverse members 38, 39.

The plate 26 has a longitudinal slot 40 formed centrally therein adjacent its front end. A frame 42 is detachably mounted upon the top surface of the plate 26 surrounding the slot 40 and serves to retain removable spacer plates 43 extending transversely, as seen in Fig. 5, and grouped as desired to control the longitudinal position of a kingpin 44 secured in rigid relation to the plate 26 by any suitable means, such as nut 46 bearing on washer 48. The kingpin 44 projects below the bottom surface of the plate 26 to seat in the socket of the fifth wheel member 18 and to be locked by the locking means 19 of the fifth wheel in a manner well understood in the art. Thus it will be seen that the fifth wheel 18 is received between the side flanges 28 of the tandem main frame to accommodate minimum vertical spacing between the main frame 24 and the chassis 10 of the tractor.

At an intermediate point along the length of the main frame 24 a second fifth wheel unit 50 is mounted upon a transverse pivotal axis 52, as by means of brackets 54 mounted upon the plate 32, or by any other suitable means which are so arranged as to locate the axis of the pivot pin 52 below the level of the top edges of the frame member 24 rearwardly of the front top plate portion 26, so that the level of the top surface of the fifth wheel 50, when horizontal, will have a minimum vertical clearance with the top of the frame 24. The fifth wheel 50 is adapted to engage and interlock with the kingpin depending from the bearing plate 22 at the bottom surface of the front portion of the semi-trailer chassis 20. By this arrangement the pivot axes of connection between the tractor and the tandem attachment on the one hand, and between the tandem attachment and the semi-trailer on the other hand, are spaced longitudinally and are offset slightly vertically, but in the main are compactly arranged for low level positioning of the frame 20 of the semi-trailer.

In rearwardly and laterally outwardly spaced relation to the fifth wheel 50 adjacent the rear end of the main frame unit 24 are mounted tubular members 60 whose upper end portions are notched at 62 to receive the frame structures 24 and whose inner portions seat in apertures in the bottom plate 32. Each tube 60 is welded or otherwise fixedly anchored to the plate 32 and the frame 24 in opposed relation to the other. The rearmost transverse support 39 may extend between the tubular members 60 for further support of the structure at the point at which the tubular members 60 are connected to the structure. The tubular members 60 extend perpendicular to the plate 32 and depend therebelow for a substantial distance. The upper ends of the tubes 60 may mount closure plates 64 spanning the opening between the same and the frame members 24, as seen in Fig. 3. A transverse plate 66 spans the interior of the tube 60 intermediate its height and preferably is welded thereto and to the bottom surface of the frame member 24. The plate 66 preferably carries a piloting or centering member 68 centrally thereof and depending therefrom.

Axle member 70 mounts supporting wheels 72 which may be equipped with brakes and brake actuators as well understood in the art. At spaced points the axle mounts plates 74 positioned or anchored in horizontal position by gusset members 76 welded to the plates and axle. Each plate 74 mounts a tubular member 78 whose inner diameter is larger than the outer diameter of the tube 60 and which telescopes therearound. The plate 74 has an upwardly projecting centering member 80 which, in cooperation with the centering member 68, centers an inner coil spring 82. An outer coil spring 84 fits around spring 82, and both springs 82 and 84 bear at their lower ends upon the transverse plate 74 and support the cross-plate 66 at their upper ends, either directly or through a spacer 67. The springs 82 and 84 thus constitute the spring suspension means for the frame of the tandem attachment. If desired, the plate 74 may have an opening 86 therein to constitute a drain for moisture which collects within the tube 78.

Bracing means connect the tubular members 78 and the axle of the running gear and include transverse structural members 90, here shown as of rectangular tubular cross-section although it may be of any form found suitable. The member 90 is welded or otherwise secured to the tubular members 78 intermediate the height thereof and spaced above the axle 70. Additional bracing members 92 preferably connect the transverse member 90 and the axle 70 and are here shown as inclined welded brace members. Gusset braces 94 are positioned substantially horizontally and are welded to each tube 78 and the transverse member 90. These gusset members preferably have apertures therein through which pass elongated vertical rods 96 fixedly secured to the main frame structure, as at members 32 or 39. Rods 96 are provided with enlarged heads 98 at their lower ends normally spaced below the gusset members. If desired, coil springs 101 may be interposed between the head 98 and the gusset, as illustrated at the right in Fig. 2. The members 90—94 serve to provide a strong wheel-mounting running gear unit effectively reinforced to withstand lateral stresses and strains imposed upon the tubular member 78 and the axle 70. Also, the construction insures against distortion or wrecking of the parts incident to use, thereby insuring that the device will not bind or otherwise become inoperative during use. The members 96 serve to guide the relative movement of the members 60 and 78 to supplement their telescopic guided interfitting relation and to eliminate the necessity for a snug fit between the parts 60 and 78. Additionally, the heads 98 serve to limit endwise movement between the parts 60 and 78 to prevent disassembly thereof unintentionally. The head members may be integral parts of the members 96, in which event the members 96 will be detachably mounted, or the head members 98 may constitute nuts mounted upon the members 96 detachably. Ready separation of the device for repairs and replacement of parts is therefore accommodated.

A pair of upright frame members 100 are fixedly secured to the side frame portions 24 intermediate the length of the main frame and are spaced apart a distance greater than the width of the truck chassis 10. The parts 100 are preferably so positioned as to receive the rear end of the truck chassis 10 therebetween when the tandem attachment is operatively connected to the truck, as illustrated in Fig. 1. The members 100 constitute structural members of any desired configuration, such as cooperating channel bars defining a box structure. Suitable brace members 102 may be connected to the main frame members 24 and to the upright members 100 to position and support the latter. At their lower ends, the members 100 are connected by a rigid structural transverse member 104. A radius rod connects the lower end of the upright frame at members 100 or at the opposite ends of the transverse member 104 with opposite end portions of the axle 70. Thus a bracket 106 may be carried by the depending frame unit 100—104, to which is pivoted at 108 one rigid screw-threaded bar 110 having connection by a turnbuckle 112 with a second rigid screw-threaded bar 114 pivoted at 116 to projecting members 118 welded to and projecting from the axle 70. The preferred construction of the pivotal connections of the ends of the radius rod with the associated parts of the tandem device is illustrated in Fig. 4 which bears numerals indicating the radius rod parts associated with the axle 70. Spaced rigid projecting members 118 are welded or otherwise secured to the axle 70 and mount transversely extending axially aligned spaced rigid tubular members 120. The bar 114 extends between the tubes 120 and has an aperture 122 therethrough which receives the shank of an elongated bolt 124. Washers or spacers 126 engage the bar 114 within the ends of the tubes 120 and are engaged by the inner ends of rubber blocks 128 within the tubes 120 through which the shank 124 extends. Washers 130 fit slidably in the outer ends of the tubes 120 to bear against the outer ends of the rubber members 128. The head 132 on one end of the bolt shank 124 bears against one of the washers 130, and a nut 134 is screw-threaded on the other end of the bolt shank 124 to bear against the other washer 130. By this means rubber members 128 can be compressed in an axial direction to expand the same in a radial direction to effect a snug fit between the parts while at the same time retaining the cushioning properties of the rubber bodies. It will be apparent, therefore, that the radius rod construction accommodates vertical movement of the wheel-supported axle 70 relative to the frame while maintaining the vertical alignment of the tubular members 60 and 78 and related parts. Bracket means 140 may also be provided at one or more points on the member 104 for pivotal connection at 142 of strut means 144 which, when lowered to the full line position shown in Fig. 1, cooperates with the wheel 72 to support the tandem attachment in operative position when disconnected from a tractive vehicle. Retainer means 146 may be mounted upon the upright members 100 to detachably hold the strut 144 in inoperative position, as shown in dotted lines in Fig. 1.

It will be apparent from the description and the drawings that the tandem attachment is connected to the tractor and semi-trailer easily and quickly by the simple expedient of the conventional turntables or fifth wheels commonly employed to connect tractive and trailing vehicles. The frame 24 takes the stress exerted by the semi-trailer and divides the same between vehicle wheels 14 and the tandem attachment wheels 72, and thereby reduces to a fraction of the load the stress or weight which is exerted upon each set of wheels. This will enable the loading of a semi-trailer to take full advantage of its capacity and at the same time avoid excess loading on any one axle with respect to the load limits imposed by statutes of the various States. The tandem attachment is prevented from jackknifing incident to backing of the tractor-trailer unit by virtue of the maintenance of alignment thereof with the truck body resulting from extension of the truck body 10 between the vertical parts 100 of the tandem unit. At the same time at least a minimum amount of turn can be provided between the tandem frame 24 and the vehicle frame 10 about the kingpin 44 as a center during normal travel of the tractor-trailer unit, so that the tandem wheels will follow normally behind the tractor without involving side slipping thereof incident to turning of corners.

The device is sturdy and will withstand the shock and wear of heavily loaded travel by reason of its sturdiness and also by reason of the provision of the radius rods for controlling the position of the lower portion of the running gear of the tandem unit and particularly for controlling the position of the tubular member 78 relative to the member 60 and the position of the axle 70 lengthwise of the tandem attachment. Torque and twisting strains and lateral pressures are resisted by the transverse reinforcement of the unit. At the same time effective spring suspension is provided which accommodates vertical play of the wheels 72 independent of the springing of the truck wheels 14 to satisfy ground conditions encountered by the different wheels. It will also be apparent that irregularities of the ground along the path of travel of the vehicle are accommodated by virtue of the transverse axes of the respective fifth wheel units so that at any time that the truck or tractive vehicle is positioned in one longitudinal attitude, and the trailer is positioned in a different longitudinal attitude, the tandem attachment wheels 72 will nevertheless be in firm engagement with the ground and will sustain under that condition their portion or share of the weight or load of the semi-trailer.

The device may be used as a semi-permanent attachment to a semi-trailer with disconnection of the truck therefrom effected at the turntable or fifth wheel 18 and the kingpin 44 by the simple expedient of lowering the struts 144 in advance of disconnection of the fifth wheel 18, 44. Alternatively, the tandem attachment may remain connected to the truck and disconnection effected at the semi-trailer, in which event the semi-trailer will be supported upon the conventional front end collapsible strut, well known in the trade.

While I prefer the construction illustrated in Figs. 1 to 6 entailing the spring suspension employing the coil springs 82 and 84, other cushioning or suspension means may be employed, if desired. One such means is illustrated in Fig. 7 and entails the provision, upon the side frame members at longitudinally spaced points, of plates or shoes 150 to press against the upper ends of resilient pads 152, such as rubber pads or blocks, which in turn are mounted upon plates or pads 154 carried by the cross member 156 of an upright member 158, to the lower end of which the axle 70 is welded, as by means of gusset plates 76. The radius rod assembly 110—114 pivoted at 116 to a depending projection 118 on the axle, and pivoted at 108 to a bracket on the lower end of a rigid transverse structure 100—104, is employed in the same manner described above. This device possesses substantially the same advantages and operates in substantially the same manner and has the same stability and strength previously mentioned.

While the preferred embodiments of the invention have been described and illustrated, it will be understood that changes in construction may be made within the scope of the appended claims without departing from the spirit of the invention.

I claim:

1. A device of the character described, comprising a rigid main frame, a kingpin depending from a high level portion of said frame at the front end thereof, a fifth wheel unit carried by said frame intermediate the length thereof at a low level portion of said frame, a running gear unit mounting the rear end of the frame, said running gear unit including wheels, an axle, a rigid structure including a pair of spaced upright tube members, and a coil spring in each tube, a second pair of spaced upright tube members carried by said frame and telescopically interfitting with said first tube members and each encircling a spring, and radius rods pivoted on axes substantially parallel to said axle at their ends to said main frame and the lower end of said running gear unit.

2. A device of the character described, comprising a rigid main frame, a kingpin depending from a high level portion of said frame at the front end thereof, a fifth wheel unit carried by said frame intermediate the length thereof at a low level portion of said frame, a running gear unit mounting the rear end of the frame, said running gear unit including wheels, an axle, a rigid structure including a pair of spaced upright tube members, and a coil spring in each tube, a second pair of spaced upright tube members carried by said frame and telescopically interfitting with said first tube members and each encircling a spring, and radius rods pivotally connected at their ends on axes substantially parallel to said axle to said main frame and the lower end of said running gear unit, and lost motion guide members cooperating with main frame and running gear and operative to limit relative vertical movement between said main frame and running gear.

3. A device of the character described, comprising a rigid substantially horizontal main frame, a pair of fifth wheel connector elements spaced lengthwise of said frame at different levels for connection with tractive and trailing vehicles, a pair of upright tubes carried by and depending from said frame, a pair of supporting wheels, an axle journaling said wheels, a pair of spaced upright tubes mounted on said axle and interfitting telescopically with said first tubes, a coil spring housed in each set of interfitting telescoping tubes, cross-brace means connecting said tubes above said axle, a rigid depending structure carried by said main frame in longitudinally spaced relation to said axle, a projection on said axle, and a radius rod pivoted at its opposite ends to said projection and the lower portion of said depending main frame structure to swing vertically.

4. A device of the character described, comprising a rigid substantially horizontal main frame, a pair of fifth wheel connector elements spaced lengthwise of said frame at different levels for connection with tractive and trailing vehicles, a pair of upright tubes carried by and depending from said frame, a pair of supporting wheels, an axle journaling said wheels, a pair of spaced upright tubes mounted on said axle and interfitting telescopically with said first tubes, a coil spring housed in each set of interfitting telescoping tubes, cross-brace means connecting said tubes above said axle, a rigid depending structure carried by said main frame in longitudinally spaced relation to said axle, a projection on said axle, and a radius rod pivoted on axes parallel to said axle at its opposite ends to said projection and the lower portion of said depending main frame structure, said axle and telescoping tubes being located in rearwardly spaced relation to said fifth wheel connector elements and said depending main frame structure being located forwardly of said axle, and a folding strut carried by said depending frame structure and shiftable between a lowered supporting position and an elevated retracted position.

5. A device of the character described, comprising a rigid substantially horizontal main frame, a pair of fifth wheel connector elements spaced lengthwise of said frame at different levels for connection with tractive and trailing vehicles, a pair of upright tubes carried by and depending from said frame, a pair of supporting wheels, an axle journaling said wheels, a pair of spaced upright tubes mounted on said axle and interfitting telescopically with said first tubes, a coil spring housed in each set of interfitting telescoping tubes, cross brace means connecting said tubes above said axle, a rigid depending structure carried by said main frame in longitudinally spaced relation to said axle, a projection on said axle, and a radius rod pivoted at its opposite ends to said projection and the lower portion of said depending main frame structure to swing vertically, and means for limiting relative extension of said telescoping members.

6. A device of the character described, comprising a rigid substantially horizontal main frame, a pair of fifth wheel connector elements spaced lengthwise of said frame at different levels for connection with tractive and trailing vehicles, a pair of upright tubes carried by and depending from said frame, a pair of supporting wheels, an axle journaling said wheels, a pair of spaced upright tubes mounted on said axle and interfitting telescopically with said first tubes, a coil spring housed in each set of interfitting telescoping tubes, cross brace means connecting said tubes above said axle, a rigid depending structure carried by said main frame in longitudinally spaced relation to said axle, a projection on said axle, and a radius rod pivoted at its opposite ends to said projection and the lower portion of said depending main frame structure, the pivot connections of said radius rod having axes substantially parallel to said axle and including friction means retarding pivotal movement of said rod and cushioning the pivotally connected parts.

7. A device of the character described, comprising a rigid substantially horizontal main frame, a pair of fifth wheel connector elements spaced lengthwise of said frame at different levels for connection with tractive and trailing vehicles, a pair of upright tubes carried by and depending from said frame, a pair of supporting wheels, an axle journaling said wheels, a pair of spaced upright tubes mounted on said axle and interfitting telescopically with said first tubes, a coil spring housed in each set of interfitting telescoping tubes, cross-brace means connecting said tubes above said axle, a rigid depending structure carried by said main frame in longitudinally spaced relation to said axle, a projection on said axle, and a radius rod pivoted at its opposite ends to said projection and the lower portion of said depending main frame structure, the pivot connections of the connected elements consisting of said radius rod and connected parts comprising a pivot pin substantially parallel to said axle extending through an aperture in one of said connected elements, spaced axially aligned sockets carried by the other connected element and receiving the ends of said pivot pin, a resilient member carried by each socket and having a passage receiving said pivot pin, and means for axially contracting said resilient members at opposite sides of said first connected element to expand the same transversely into tight fitting frictional engagement in said sockets.

References Cited in the file of this patent

UNITED STATES PATENTS

| | | |
|---|---|---|
| 2,030,263 | Mercer | Feb. 11, 1936 |
| 2,047,336 | Stout | July 14, 1936 |
| 2,264,174 | Crump | Nov. 25, 1941 |
| 2,577,322 | Frazier | Dec. 4, 1951 |
| 2,643,890 | Smith | June 30, 1953 |
| 2,714,016 | Smith | July 26, 1955 |